United States Patent [19]
Horigome

[11] 3,738,247
[45] June 12, 1973

[54] MECHANISM FOR FLASH ATTACHMENT CAMERA SHUTTER CONTROL

[75] Inventor: Hirofumi Horigome, Kawasaki, Japan

[73] Assignee: Ricoh Co. Ltd., Tokyo, Japan

[22] Filed: July 25, 1972

[21] Appl. No.: 275,105

[30] Foreign Application Priority Data
July 29, 1971 Japan.............................. 46/56987

[52] U.S. Cl.......................... 95/53 R, 95/57, 95/62, 95/63
[51] Int. Cl. ............................................. G03b 9/08
[58] Field of Search................ 95/53 R, 57, 11.5 R, 95/62, 63

[56] References Cited
UNITED STATES PATENTS
| | | | |
|---|---|---|---|
| 706,507 | 8/1902 | Folmer................................... | 95/57 |
| 2,673,501 | 3/1954 | Duchallier ............................ | 95/57 |

Primary Examiner—Samuel S. Matthews
Assistant Examiner—Russell E. Adams, Jr.
Attorney—Robert S. Dunham, Lester W. Clark, Thomas P. Dowd et al.

[57] ABSTRACT

A mechanism for flash attachment cameras, which when the shutter speed setting means is set at a position for flashbulb operation, moves a switch out of the path of movement of a lock means to permit the latter, upon depression of the shutter release button, to lock a rotary member, such as an escapement wheel, operatively connected to the shutter closing thus holding the shutter open during flashbulb operation. When the shutter speed setting means is set at a position other than that for flashbulb operation, the switch is moved into the path of movement of the lock means to prevent the latter from locking the rotary member. Resilient means is provided between the lock means and the shutter release button to permit the latter to be operated while the former is in its inoperative condition.

6 Claims, 6 Drawing Figures

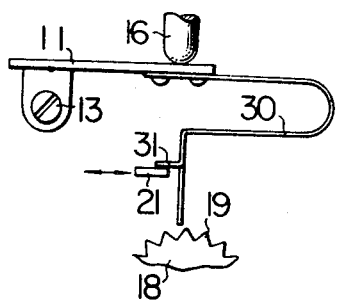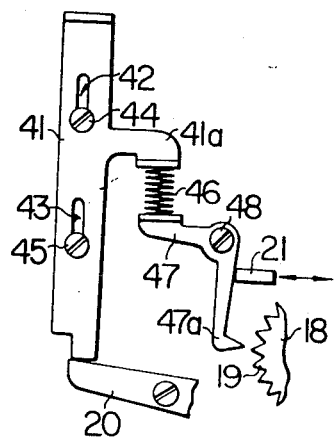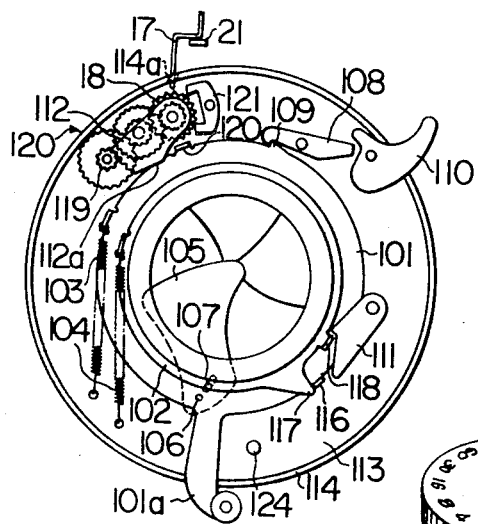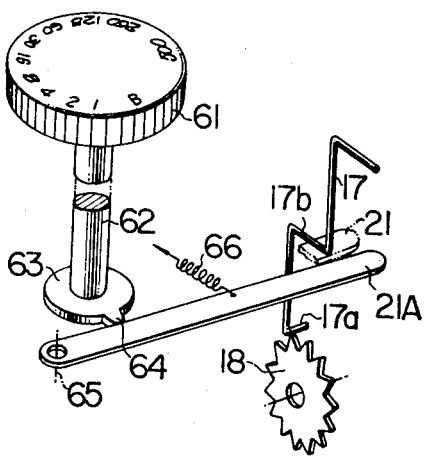

/* 3,738,247 */

MECHANISM FOR FLASH ATTACHMENT CAMERA SHUTTER CONTROL

BACKGROUND OF THE INVENTION

This invention relates to flashbulb setting mechanisms for shutters of photographic cameras, and more particularly it is concerned with a setting mechanism which permits the shutter to be maintained in an open position while the shutter button is being depressed to permit flashbulb operation.

In order to obtain a flashbulb setting operation of the shutter of a camera, it has hitherto been customary to adopt means, in the case of a focal plane shutter for example, for stopping a cam or other rotary member which moves together with the rear screen of the focal plane shutter to prevent shutter closing. Since such rotary members operate with a high rotary power, the stopping operation can result in damage to the rotary member or producing a shock to the system during each operation.

In cameras where the shutter release means does not have a large stroke, such as the release button of a sensor release mechanism, it has been impossible due to the small stroke to obtain a sufficiently efficient releasing action to check the closing of the shutter. These disadvantages of the prior art have led some camera manufacturers to do without a flashbulb setting mechanism in their cameras.

SUMMARY OF THE INVENTION

This invention involves a flashbulb setting mechanism for a camera shutter, which operates in conjunction with the shutter release means, to render a rotary member of low rotary power coupled to the shutter closing means inoperative only when the shutter speed setting means is set at a position for flashbulb operation whereby the flashbulb operation can be performed positively with a very low force. The rotary member may be coupled to the rear screen drum for a focal plane shutter or the shutter blade opening and closing ring for a lens shutter.

This invention not only obviates the aforementioned disadvantages of the prior art but also permits cameras provided with shutter release means of a small stroke like a sensor release mechanism to perform a full flashbulb operation with a low force.

BRIEF EXPLANATION OF THE DRAWINGS

FIG. 2, FIG. 3 and FIG. 4 are front views of other embodiments of the flashbulb mechanism according to this invention;

FIG. 5 is a fragmentary front view of a lens shutter in which this invention is incorporated, showing its construction; and FIG. 6 is a perspective view showing one form of means for connecting the shutter speed setting means to the switch means.

DESCRIPTION OF THE PREFERRED EMBODIMENTS

Figure 1:
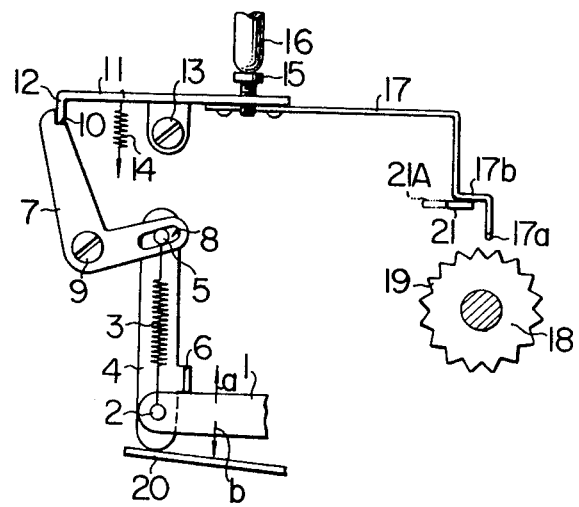
FIG. 1 is a front view of the flashbulb mechanism for a shutter of a photographic camera comprising one embodiment of this invention.

The invention will now be described with reference to the embodiments shown in the drawings.

In FIG. 1, a spring 3 is attached at one end to a pin 2 affixed to an end portion of a charge lever 1 and at the other end to a pin 5 affixed to an upper end of a release rod 4. Thus, charge lever 1 is normally urged to move in the direction of arrow *a* by the biasing force of spring 3. The movement of charge lever 1 in this direction is restricted by an outwardly extending bent portion 6 formed on an edge of release rod 4.

Pin 5 is received in a slot 8 formed in one end portion of a pivotal lever 7 which is pivotally supported by a fixed shaft 9. Pivotal lever 7 has formed, at the other end portion thereof, a cutout 10 which is engaged by one end 12 of a release lever 11. Release lever 11 is pivotally supported by a fixed shaft 13 and is normally urged by the biasing force of a spring 14 to move counter clockwise in the figure so as to bring its bent end 12 into engagement with cutout 10 in pivotal lever 7. Threadably connected to the other end portion of release lever 11 is a height adjusting pin 15 which is positioned with its head against a rod 16 that moves in slaved relation to a sensor release mechanism or a shutter button (not shown).

Rotary member lock means 17, formed of a resilient wire in a bent shape, is secured at its base to the other end portion of release lever 11 and includes a forward bent portion 17a which is juxtaposed to a serration 19 formed in an appropriate rotary member such as escapement wheel 18 which is part of a governor (FIG. 5) and which has the lowest rotary power of all the members of the governor. Rotary member lock means 17 also includes an intermediate bent portion 17b that is positioned against switch means 21 which is adapted to check the movement of rotary member lock means 17 when shutter speed setting means, such for example as a shutter dial shown in FIG. 6, is set at a position other than that for flashbulb operation.

Switch means 21 is coupled by suitable means to the shutter speed setting means in such manner that, only when the shutter speed setting means is set at the position for flashbulb operation, will switch means 21 be moved to a dash-and-dot line position 21A shown in FIG. 1 to permit rotary member lock means 17 to be brought into engagement with escapement wheel 18.

One form of means for coupling switch means 21 to shutter dial 61 or other shutter speed setting means is shown in FIG. 6. In the figure, a plate cam 63 is secured to a shaft 62 for supporting shutter dial 61. The plate cam 63 is formed on its periphery with a protuberance 64 in a position which corresponds to the position of flashbulb operation mark B on shutter setting dial 61. The switch means 21 is pivotally supported at its base by a shaft 65 and a biasing spring 66 is connected to the switch means 21 to urge it in a direction in which it is maintained in engagement with the periphery of the plate cam 62. Thus, the switch means 21 is brought into engagement with the protuberance 64 in plate cam 63 when shutter dial 61 is set at the position for the flashbulb operation. This results in switch means 21 being brought out of engagement with rotary member lock means 17 to permit the movement of the latter. When the switch means 21 is brought out of engagement with the protuberance 64 to come into engagement with the rest of the periphery of plate cam 63 upon setting shutter dial 61 at a position other than that for flashbulb operation, the front end portion of switch means 21 checks the movement of the rotary member lock means 17.

Referring again to FIG. 1, the aforementioned charge lever 1 is a mirror spring set lever adapted to operate in conjunction with a film advance mechanism in the case of a focal plane shutter, and a shutter charge lever in the case of a lens shutter. Charge lever 1 is moved in the direction of arrow b when film is advanced so as to charge spring 3.

If push rod 16 is depressed or moved downwardly in FIG. 1 when spring 3 is in charged position, then release lever 11 pivots clockwise against the biasing force of spring 14, with a result that lever end 12 is released from engagement with the cutout 10 in pivotal lever 7. This permits pivotal lever 7 to pivot clockwise and allows release rod 4 to be moved downwardly by the biasing force of spring 3. Downward movement of release rod 4 depresses a release member 20 to initiate the operation of the shutter. Release member 20 is a shutter release member in the case of a lens shutter, a release member for the front screen in the case of a focal plane shutter and a release member for the reflector in the case of a single-lens reflex camera.

If switch means 21 is in solid line position when push rod 16 is depressed as aforementioned, downward movement of rotary member lock means 17 will be prevented thereby and portion 17a cannot engage escapement wheel 18. This allows actuation of the governor to permit the shutter to perform other operations than the flashbulb operation. However, if switch means 21 is in dash-and-dot line position 21A, depression of push rod 16 will bring the front bent portion 17a of rotary member lock means 17 into engagement with the serration 19 in escapement wheel 18, thereby preventing the rotation of escapement wheel 18. Since the governor is rendered inoperative while escapement wheel 18 is stationary, the shutter will be kept in an open position until push rod 16 is released thus permitting the flashbulb operation to be performed.

In this embodiment, rotary member lock means 17 may be made a sufficiently great length to permit portion 17a to act satisfactorily in preventing the rotation of the escapement wheel 18 even if the stroke of push rod 16 is small as is the case where a sensor release mechanism is used. The resilience of rotary member lock means 17 permits release lever 11 to be moved in pivotal motion by depressing push rod 16 while the downward movement of rotary member lock means 17 into its operative position is prevented by switch means 21.

The aforementioned escapement wheel 18 may be any rotary member of relatively low rotary power coupled to the aforementioned governor for performing the shutter closing action. Accordingly, the rotary member according to this invention may be a gear suitably provided separately which is adapted to increase the rage of revolution step by step, instead of being the ultimate gear of the governor so it is possible to positively obtain flashbulb operation of the shutter with a low checking force, because it is accomplished by precluding the rotation of a rotary member of low rotary power as aforementioned.

Other embodiments of the invention will be described with reference to FIG. 2 to FIG. 4. In all the drawings, like reference characters designate similar parts and such parts are described only once in the interest of brevity.

Figure 2:
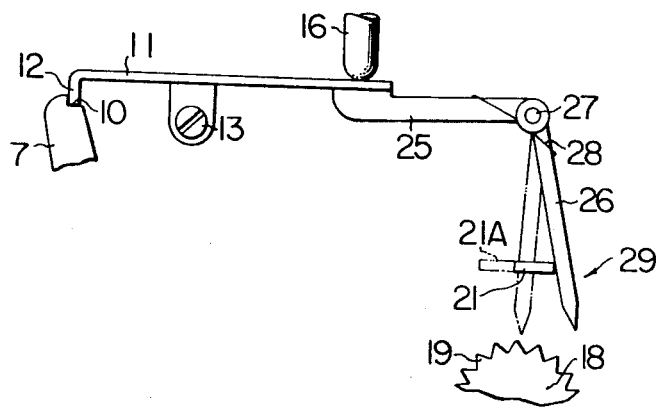

FIG. 2 shows a rotary member lock means 29 comprising a change-over arm 26 pivotally supported by a shaft 27 and connected to a front end of an arm 25 secured to release lever 11. Arm 26 is normally urged to move clockwise by the biasing force of a spring 28. Switch means 21 moves change-over arm 26 to a position in which it is unable to lock escapement wheel 18 when the former is in the solid line position. However when means 21 is in the dash-and-dot line position 21A, change-over arm 26 is moved under the action of spring 28 to a position in which it is capable of locking escapement wheel 18.

A rotation precluding member 30 shown in FIG. 3 is formed of a resilient wire or belt bent in the shape of a letter U and placed in a lying position with the upper end portion of one leg bent downwardly to be positioned against escapement wheel 18. Switch means 21 is adapted to engage a projection 31 formed in the downwardly bent portion precluding means 39 to prevent it from moving into locking position when push rod 16 is depressed.

FIG. 4 shows rotary member lock means 47 of the bellcrank type connected at one end through a spring to a bent portion 41a of a release rod 41. Rod 41 is formed with slots 42, 43 for receiving therein pins 44, 45, respectively on which rod 41 may be moved vertically to operate in the manner of rod 4 in FIG. 1. The movement of release rod 41 is made possible by the resilience of spring 46. Rotary member lock means 27, which is pivotally supported by a shaft 48, is caused by switch means 21 to lock or unlock escapement wheel 18, by means of finger 41a at the other end thereof, ad switch means 21 operates in association with shutter speed setting means.

For a description of the control of shutter operation by the governor, reference is made to FIG. 5. FIG. 5 shows an example of the flashbulb setting mechanism according to this invention incorporated in a lens shutter. In FIG. 5, a first ring 101, which is adapted for releasing the shutter blades, is biased by a first operation spring 103, and a second ring 102 which is adapted for closing the blades is biased by a second main operation spring 104. The first and second rings 101 and 102 are set by pushing and moving an arm 101a projecting from the first ring 101 in the clockwise direction. When the rings 101 and 102 are in the position shown in the figure, a projection 116 formed in the first ring 101 is maintained in abutting engagement with a projection 117 formed in the second ring 102.

A plurality of shutter blades 105 each formed therein with a slot 105a (only one shown for clarity) are each pivotally supported by a pin 106 secured to the first ring 101. Pins 107 secured to the second ring 102 are each also received in the slots 105a formed in the shutter blades 105. An engaging pawl 108 shown in engagement with a projection 109 formed in the first ring 101 holds the ring 101 against rotation by the spring 103 and is released from engagement therewith by a release lever 110 when the shutter is released. A pawl 111 shown in engagement with a projection 118 formed in the second ring 102 to preclude rotation of the second ring 102 is released from engagement with the projection 118 when a projection 116 formed in the first ring 101 strikes the pawl 111. A second gear 119 maintained in meshing engagement with a governor sector gear 112 is connected through a gear train 120 mounted on the underside of a bottom 113 to escapement wheel 18 which has its timing controlled by an anchor 121. The rotary member lock means 17 extends through an opening 114a formed in a case 114 and has forward bent portion 17a juxtaposed to the serrations on the escapement wheel 18.

When the shutter is released and the release lever 110 pushes and moves the engaging pawl 108 while the parts are in the aforementioned positions, the first ring 101 is released and the first and second rings 101 and 102 are rotated by the biasing forces of the springs 103 and 104 respectively. Rotation of the second ring 102 is interrupted as the projection 118 is brought into engagement with the pawl 111, but the first ring 101 continues to rotate and causes a change in the relative positions of the pins 106 and 107 to open the shutter blades 105. When all the shutter blades are fully open, a projection 120 on the first ring 101 is brought into contact with a protuberance 112a formed on the sector gear 112, so that the governor is set in motion and the exposure time is adjusted.

Further rotation of the first ring 101 results in the projection 116 pushing and moving the pawl 111, so that the projection 118 is released from engagement with the pawl 111 and the second ring 102 begins to rotate again. Rotation of the first ring 101 is interrupted as its arm 101a abuts against a pin 124. When projection 117 formed in the second ring 102 is again brought into engagement with the projection 116 in the first ring 101, all the shutter blades 105 are closed.

If the rotary member lock means 17 renders the escapement wheel 18 stationary as the result of the shutter being set for flashbulb operation, the first ring 101 will begin to rotate when the shutter is released and all the shutter blades 105 will be fully opened. Thereafter, when the projection 120 is brought into contact with the protuberance 112a in the sector gear 112, the sector gear 112 is not actuated, so that rotation of the first ring 101 is interrupted and the shutter is maintained in a fully open position for flashbulb operation. When the rotary member lock means 17 is released from engagement with the escapement wheel 18, the shutter will be actuated as aforementioned and the flashbulb exposure operation is finished.

It will be seen that the rotary member lock means and resilient means may be adapted within the teaching of this invention to a construction which may suit the design of the camera as a whole. Also the flashbulb mechanism according to this invention can have application in focal plane shutters, lens shutters or other shutters of any type.

What I claim is:

1. A mechanism for controlling the flashbulb setting in a camera of the type having:
   a. shutter speed setting means;
   b. shutter releasing means; and
   c. shutter closing means;
   wherein the improvement comprises:
   d. a rotary member coupled to said closing means;
   e. rotary member lock means operated by said shutter release means and movable between a rotary member locking position and a rotary member unlocking position;
   f. switch means coupled to said shutter speed setting means for normally maintaining said rotary member lock means in its unlocking position and for releasing it to lock said rotary member and thus said shutter closing means when said shutter speed setting means is set at its flashbulb operating position; and
   g. resilient means interposed between said shutter releasing means and said rotary member lock means to permit said shutter releasing means to operate said shutter closing means when said rotary member lock means is in its inoperative position.

2. A mechanism in claim 1 wherein said rotary member is an escapement wheel.

3. A mechanism as in claim 1 wherein at least a portion of said rotary member lock means is made of a resilient material whereby it serves as said resilient means.

4. A mechanism as in claim 1 wherein said shutter speed setting means is a shutter dial.

5. A mechanism as in claim 4 wherein said switch means prevents said rotary member lock means from moving to its operative position by pivotally moving into engagement with a plate cam formed in its periphery with a cutout and coupled to said shutter dial.

6. A mechanism as in claim 1 wherein said rotary member lock means comprises a bell-crank, one arm of which is adapted to engage said rotary member and the other arm of which is adapted to engage said resilient means.

* * * * *